(12) United States Patent
Takahashi et al.

(10) Patent No.: US 12,516,165 B2
(45) Date of Patent: Jan. 6, 2026

(54) HEAT-SHRINKABLE POLYESTER FILM

(71) Applicants: Bonset America Corporation, Browns Summit, NC (US); C.I. TAKIRON CORPORATION, Osaka (JP); Bonset Latin America S.A., Barros Blancos Canelones (UY)

(72) Inventors: Hideaki Takahashi, Browns Summit, NC (US); Ebonii Nicole Neal, Browns Summit, NC (US); Victoria Marie Moncada Meeks, Browns Summit, NC (US)

(73) Assignees: Bonset America Corporation, Browns Summit, NC (US); C.I. TAKIRON Corporation, Osaka (JP)

( * ) Notice: Subject to any disclaimer, the term of this patent is extended or adjusted under 35 U.S.C. 154(b) by 475 days.

(21) Appl. No.: 18/019,822

(22) PCT Filed: Nov. 15, 2021

(86) PCT No.: PCT/US2021/059300
§ 371 (c)(1),
(2) Date: Feb. 6, 2023

(87) PCT Pub. No.: WO2022/108854
PCT Pub. Date: May 27, 2022

(65) Prior Publication Data
US 2023/0287189 A1 Sep. 14, 2023

Related U.S. Application Data

(60) Provisional application No. 63/116,077, filed on Nov. 19, 2020.

(51) Int. Cl.
*C08J 5/18* (2006.01)
*C08L 67/02* (2006.01)

(52) U.S. Cl.
CPC ............. *C08J 5/18* (2013.01); *C08L 67/02* (2013.01); *C08J 2367/02* (2013.01); *C08L 2203/16* (2013.01)

(58) Field of Classification Search
CPC ......................................................... C08J 5/18
(Continued)

(56) References Cited

U.S. PATENT DOCUMENTS

2021/0214583 A1 7/2021 Kaneko et al.
2021/0230393 A1 7/2021 Shin et al.

FOREIGN PATENT DOCUMENTS

JP H01127317 * 5/1989
JP 2009226948 A * 10/2009
(Continued)

*Primary Examiner* — Randy P Gulakowski
(74) *Attorney, Agent, or Firm* — Yokoi & Co., U.S.A.; Toshiyuki Yokoi

(57) ABSTRACT

The present invention relates to a heat-shrinkable polyester film having low thermal shrink stress for wall thickness reduction of PET bottles without inhibiting the recyclability of PET bottles. The provided is a heat-shrinkable polyester film derived from a polyester resin as reaction product between a polyvalent carboxylic acid and a polyalcohol, wherein the film has the following characteristics (A) to (D). (A) The melting point measured by DSC of the polyester resin is within 190 to 255° C. (B) to (D) Under predetermined conditions, the heat shrinkage ratio in the main shrinkage direction is within 45 to 70%, the heat shrinkage ratio in the direction orthogonally intersecting the main shrinkage direction is within −1 to 6%, and the thermal shrink stress in the main shrinkage direction is 16 MPa or less.

8 Claims, 10 Drawing Sheets

(58) Field of Classification Search
USPC .......................................................... 528/272
See application file for complete search history.

(56) References Cited

FOREIGN PATENT DOCUMENTS

| JP | 2011211087 | * | 10/2011 | | |
|----|----|----|----|----|----|
| JP | 2012-36273 A | | 2/2012 | | |
| JP | 2019-177930 A | | 10/2019 | | |
| JP | 2020-521823 A | | 7/2020 | | |
| MY | 154404 A | * | 6/2015 | ................ | C08J 5/18 |
| WO | WO-2019188337 A1 | * | 10/2019 | ................ | C08J 5/18 |
| WO | 2019/230843 A | | 12/2019 | | |
| WO | 2020/076749 A | | 4/2020 | | |

* cited by examiner

HEAT-SHRINKABLE POLYESTER FILM

TECHNICAL FIELD

The present invention relates to a heat-shrinkable polyester film. More particularly, the invention relates to a heat-shrinkable polyester film which has low thermal shrink stress in order to correspond with PET bottle thickness reduction, keeping PET bottle recyclability.

BACKGROUND ART

Conventionally, bottles made of a polyethylene resin (HDPE) and bottles made of a polyester resin (PET) (hereinafter, may be simply referred to as PET bottles) are widely used as storage containers for beverages, storage containers for detergents, and the like.

Particularly, PET bottles have been globally widely distributed from the viewpoint of having excellent lightweightness and durability and being highly convenient as storage containers for beverages.

On the other hand, environmental pollutions due to leakage of used PET bottles to the sea after consuming the contents of PET bottles has become a serious problem in the world.

In this regard, in order to solve such an environmental problem, recovery of PET bottles and development for plastic recycling technology have been actively performed.

Furthermore, PET bottles are covered around with a predetermined display labels in order to indicate various kinds of information about the name and contents and to enhance decorativeness and the like.

In this regard, conventionally, a method of pasting a paper label with an adhesive has been often used, but recently, full-surface packaging using a heat-shrinkable film is more common.

However, in the case of full-surface packaging with heat-shrinkable film, there is a problem for PET bottle recycling because of the difficulty of heat-shrinkable film removal due to reasons such as a tight adhesive structure of the film.

Therefore, a material for a heat-shrinkable film is preferably a material that is readily separable from a PET bottle and does not inhibit a recycling process for the PET bottle. More specifically, a polyvinyl chloride resin (PVC), a polystyrene resin (PS), a modified polyester (PETG), and the like are frequently used.

PET is a main material for storage containers for beverages, therefore, PETG base heat-shrinkable films should have high potential for compatibility to PET from the chemical composition standpoint.

On the other hand, since PETG is basically amorphous, there is a problem that PETG does not have a melting point as thermal characteristics, and in a recycling process for PET bottles wrapped with heat-shrinkable films, clumping of recycled pellets is easily induced.

That is, in case of drying pellets made in a recycling process for PET bottles wrapped with PETG base heat-shrinkable films, as shown in FIG. 9A, the recycled pellets including the heat-shrinkable film clumped and built a lump. As a result, the lump clogged in the middle of piping and caused problem in PET recycling process.

Therefore, in a case where PET bottles were recycled with a heat-shrinkable film, it was difficult to produce pellets having a predetermined shape effectively and stably without clumping as shown in FIG. 9B, using a pelletizer (hereinafter, may be simply referred to as a recyclability problem).

Thus, it has been proposed to adjust the thermal characteristics of a PETG film and to use a heat-shrinkable polyester film having a melting point (Patent Document 1 and Patent Document 2).

The heat-shrinkable polyester film having a melting point as disclosed in Patent Document 1 is a crystalline heat-shrinkable polyester film which includes a crystalline copolymerized polyester resin derived from, for example, a diol component and a dicarboxylic acid component, with a reduced blending amount of amorphous polyester-based resins, and which has a thermal shrinkage ratio in a main shrinkage direction of 30% or greater at the time of a heat treatment at 80° C. for 10 seconds and has a melting point of 170° C. or higher as measured with a differential scanning calorimeter (DSC).

Furthermore, the heat-shrinkable polyester film having a melting point as disclosed in Patent Document 2 is a crystalline heat-shrinkable polyester film which contains terephthalic acid as a main component, and in which the polyalcohols to be reacted with the terephthalic acid include a predetermined amount of ethylene glycol and at least one of neopentyl glycol, 1,4-cyclohexanedimethanol, and diethylene glycol.

However, in the case of the heat-shrinkable polyester films having melting points as disclosed in Patent Document 1 and Patent Document 2, there was a problem that the value of thermal shrink stress occurring at the time of thermal shrinkage is excessively large in both cases so that the heat-shrinkable films are likely to deform PET bottles.

Furthermore, thickness reduction of PET bottle has been attempted in order to reduce the use amount of fossil resources and to reduce the weight of the bottle so that the overall rigidity of the PET bottle has been further decreased, and it is also noted that deformation of PET bottles by the heat-shrinkable polyester films having melting points as disclosed in Patent Document 1 and Patent Document 2 is likely to be accelerated.

In addition, even in the case of the heat-shrinkable polyester films having melting points as disclosed in Patent Document 1 and Patent Document 2, nothing is considered for the value of the thermal shrinkage ratio in the MD direction and the value of thermal shrink stress in the ID direction, and there is seen a problem that the recyclability problem may not be completely solved.

CITATION LIST

Patent Document

Patent Document 1: JP 2020-521823 A (claims and the like)
Patent Document 2: WO 2020/076749 (claims and the like)

SUMMARY OF THE INVENTION

Problem to be Solved by the Invention

Thus, the present inventors have conducted thorough investigation in order to address the problems described above, and as a result, they solved the problems of the related art technologies by a heat-shrinkable polyester film derived from a polyester resin, which is a reaction product between a polyvalent carboxylic acid and a polyalcohol, the heat-shrinkable film having at least characteristics (A) to (D).

That is, the invention intends to provide a heat-shrinkable polyester film which can be effectively and stably processed into pellets having a predetermined shape even in a case where PET bottles covered with the heat-shrinkable polyester film are recycled together, and to provide a heat shrinkable film which has low thermal shrink stress occurring at the time of thermal shrinkage so as to be able to address wall thickness reduction of PET bottles and the like.

Means for Solving Problem

This invention provides a heat-shrinkable polyester film derived from a polyester resin which is a reaction product between a polyvalent carboxylic acid and a polyalcohol, and the heat-shrinkable film is satisfied with the following characteristics (A) to (D), to solve the aforementioned problems:

(A) the melting point measured by DSC (hereinafter, may be simply referred to as the melting point) of the polyester resin is within 190° C. to 255° C.;

(B) the thermal shrinkage ratio in a main shrinkage direction (may be referred to as TD direction; hereinafter, the same) as measured under the thermal shrinkage conditions of 85° C. for 10 seconds is within 45% to 70%;

(C) the thermal shrinkage ratio in a direction orthogonally intersecting the main shrinkage direction (may be referred to as MD direction; hereinafter, the same) as measured under the thermal shrinkage conditions of 60° C. to 90° C. for 10 seconds is within −1% to 6%; and (D) the thermal shrink stress in the main shrinkage direction (TD direction) as measured under the thermal shrinkage conditions of 85° C. is 16 MPa or less.

By using a polyester resin having a predetermined melting point measured by DSC according to JIS K7121:2012 as such (characteristic A) and also by limiting the thermal shrinkage ratios in the TD direction and the MD direction (characteristics B and C) respectively to values within predetermined ranges, even in a case where a PET bottle in a state of being covered with a heat-shrinkable polyester film is recycled together, inhibition of the recyclability of the PET bottle can be effectively prevented.

Furthermore, when such a heat-shrinkable polyester film is used, PET bottles thickness reduction and the like can be appropriately coped with by controlling the thermal shrink stress in the TD direction (characteristic D).

Furthermore, in case of configuring the polyester-based heat-shrinkage film of the invention, it is preferable that the thermal shrinkage ratio in a direction (MD direction) orthogonally intersecting the main shrinkage direction, which is measured under thermal shrinkage conditions of 70° C. for 10 seconds, is within 0% to 3%, as characteristic (C').

By also limiting the thermal shrinkage ratio in the MD direction under predetermined temperature conditions as such, even when the heat-shrinkable film is used to cover around a PET bottle and is subjected to thermal shrinking at a relatively low temperature, it is possible to prevent from wrinkling and collapsing during application, and as a result, it is possible to provide excellent appearance and accurate label information and the like even under energy-saving heating conditions.

Furthermore, by limiting the thermal shrinkage ratio in the MD direction as such, a balance in the overall thermal shrinkability of the heat-shrinkable polyester film is kept, so that even if the heat-shrinkable film is recycled together with PET bottles, pellets can be stably obtained by controlling stickiness, viscosity, and the like.

Furthermore, in case of configuring the heat-shrinkable polyester film of the invention, it is preferable that the thermal shrinkage ratio in a direction (MD direction) orthogonally intersecting the main shrinkage direction as measured under the thermal shrinkage conditions of 85° C. for 10 seconds is within 1% to 5%, as characteristic (C").

By limiting the thermal shrinkage ratio in the MD direction at a relatively high temperature as such, it is possible to prevent from wrinkling and collapsing during application, and as a result, it is possible to provide excellent appearance and accurate label information and the like even under energy-saving heating conditions.

Furthermore, by limiting the thermal shrinkage ratio in the MD direction at a relatively high temperature, a balance in the overall thermal shrinkability of the heat-shrinkable polyester film is kept, so that the thermal shrink stress thus generated is reduced, and even if the heat-shrinkable film is recycled with PET bottles together, pellets can be obtained more stably.

Furthermore, in case of configuring the heat-shrinkable polyester film of the invention, it is preferable that the thermal shrinkage ratio in a direction (MD direction) orthogonally intersecting the main shrinkage direction as measured under thermal shrinkage conditions of 60° C. to 90° C. for 10 seconds has at least one minimal value, and this minimal value is −1% or greater, as characteristic (C''').

By limiting the profile of the thermal shrinkage ratio in the MD direction under predetermined temperature conditions to have a minimal value of a predetermined magnitude as such, even in a case where the temperature conditions are dispersed to some extent, it can be determined more clearly that excellent appearance, accurate label information, and the like are likely to be obtained at the time of thermal shrinking, by simple actual measurement of a thermal shrinkage curve, TMA measurement, and the like.

Furthermore, by limiting the thermal shrinkage ratio in the MD direction to a predetermined temperature range, a balance in the overall thermal shrinkability of the heat-shrinkable polyester film can be kept, the thermal shrink stress thus generated can be reduced, and even if the heat-shrinkable film is recycled with PET bottles together, pellets can be obtained more stably.

Furthermore, in case of configuring the heat-shrinkable polyester film of the invention, it is preferable that the thermal shrinkage ratio in a direction (MD direction) orthogonally intersecting the main shrinkage direction as measured under the thermal shrinkage conditions of 60° C. to 90° C. for 10 seconds has at least one maximal value, and this maximal value is 0.8% or greater, as characteristic (C'''').

By limiting the profile of the thermal shrinkage ratio in the MD direction under predetermined temperature conditions to have a maximal value of a predetermined magnitude as such, it can be determined more clearly that excellent appearance, accurate label information, and the like are likely to be obtained at the time of thermal shrinking, and the occurring thermal shrink stress has a predetermined value or less.

Furthermore, on the occasion in which the profile of the thermal shrinkage ratio has a maximal value of a predetermined magnitude, it is more preferable that the profile of the thermal shrinkage ratio also has the aforementioned minimal value of a predetermined magnitude at the same time.

Furthermore, in case of configuring the heat-shrinkable polyester film of the invention, it is preferable that the film thickness is within 10 to 100 μm.

By limiting the thickness to such a range, the thermal shrinkage ratio becomes more uniform, and as a result, it is easy to control the values of the characteristics (B) and (C) of the heat-shrinkable polyester film respectively to predetermined ranges.

Furthermore, in case of configuring the heat-shrinkable polyester film of the invention, it is preferable that the polyvalent carboxylic acid includes terephthalic acid (TPA) as a main component, and the polyalcohol comprises at least one of ethylene glycol (EG), neopentyl glycol (NPG), 1,4-cyclohexanedimethanol (CHDM), and diethylene glycol (DEG).

By using these components, the crystallinity of the polyester resin is controlled, and as a result, the degree of crystallization calculated based on a DSC curve measured according to JIS K 7122:2012 and the thermal shrinkage ratio can be easily adjusted to be within predetermined ranges.

Furthermore, in case of configuring the heat-shrinkable polyester film of the invention, it is preferable that the haze value of the film before shrinking in accordance with ASTM D1003 is 7% or less.

By limiting the haze value to such a value, alinement for PET bottle or the like and scrutiny of contents are easily achieved, and before thermal shrinkage as well as after thermal shrinking, a PET bottle including a heat-shrinkable polyester film that is excellent in view of transparency, external appearance, decorative properties, and the like can be obtained.

Furthermore, in case of constructing the polyester heat-shrinkable film of the present invention, it is preferable that the calorific value corresponding to the melting peak area at the melting point measured by DSC of the polyester heat-shrinkable film is within 15 mJ/mg to 25 mJ/mg.

By limiting the calorific value corresponding to the melting peak area (ΔH) at the melting point measured by DSC of the polyester heat-shrinkable film to a predetermined range, the existing amount of the crystalline structure can be slightly limited and adjusted to provide a broad melting region.

Therefore, in the obtained polyester heat-shrinkable film, the shrink stress and the heat shrinkage ration at a predetermined temperature can be adjusted more easily and stably while maintaining the mechanical strength, the transparency, and the like of the polyester resin as a main component by the predetermined crystalline structure.

BRIEF DESCRIPTION OF THE DRAWINGS

FIG. 2 is a diagram provided to explain the relationship between the thermal shrinkage temperature and the thermal shrinkage ratio in the MD direction of the heat-shrinkable polyester films in Example 1 and the like and Comparative Example 1 and the like;

MODE(S) FOR CARRYING OUT THE INVENTION

First Embodiment

Figure 1A:
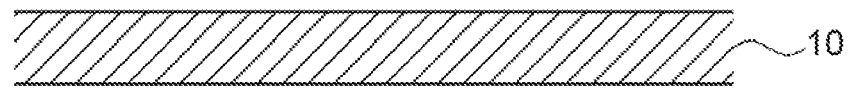
FIGS. 1A to 1C are diagrams respectively illustrating different embodiments of heat-shrinkable polyester films.

A first embodiment is a heat-shrinkable polyester film derived from a polyester resin, which is a reaction product between a polyvalent carboxylic acid and a polyalcohol, as illustrated in FIG. 1A and the like.

Furthermore, a heat-shrinkable polyester film having the following characteristics (A) to (D) is provided, and this heat-shrinkable film includes crystalline portions but exhibits low thermal shrink stress, so that the aforementioned problems can be solved.

(A) The melting point measured by DSC of the polyester resin is within 190° C. to 255° C.

(B) The thermal shrinkage ratio in a main shrinkage direction (TD direction) as measured under thermal shrinkage conditions of 85° C. for 10 seconds is within 45% to 70%.

(C) The thermal shrinkage ratio in a direction orthogonally intersecting the main shrinkage direction (MD direction) as measured under thermal shrinkage conditions of 60° C. to 90° C. for 10 seconds is within −1% to 6%.

(D) The thermal shrink stress in the main shrinkage direction (TD direction) as measured under thermal shrinkage conditions of 85° C. is 16 MPa or less.

The heat-shrinkable polyester film of the first embodiment will be specifically described below, separately for each constituent requirement, with appropriate reference to the drawings.

1. Polyvalent Carboxylic Acid

A polyvalent carboxylic acid as one of the constituent components (raw material components) of the polyester resin is not particularly limited as long as the polyvalent carboxylic acid is a compound capable of reacting with a polyalcohol and forming a polyester structure; however, for example, at least one of a fatty acid dicarboxylic acid such as adipic acid, sebacic acid, or azelaic acid; an aromatic dicarboxylic acid such as terephthalic acid, naphthalenedicarboxylic acid, or isophthalic acid; an alicyclic dicarboxylic acid such as 1,4-cyclohexanedicarboxylic acid; or ester-forming derivatives of these may be composed.

Particularly, terephthalic acid is suitable from the viewpoint of having excellent reactivity with polyalcohols, being likely to form a crystalline polyester structure, and being relatively inexpensive and economically advantageous.

Accordingly, when the total amount of the polyvalent carboxylic acid is taken as 100 mol %, it is preferable that the amount of terephthalic acid is 90 mol % or greater, and it is more preferable the amount is within 95 mol % to 100 mol %.

2. Polyalcohol
(1) Type

A polyalcohol as one of the constituent components of the polyester resin is not particularly limited as long as the polyalcohol has a plurality of reactive hydroxyl groups; however, it is preferable that for example, at least one of an aliphatic diol such as ethylene glycol, diethylene glycol, propanediol, butanediol, 2-methyl-1,3-propanediol, neopentyl glycol, or hexanediol; an alicyclic diol different from 1,4-cyclohexanedimethanol; or an aromatic diol is comprised.

Since these polyalcohols can react with polyvalent carboxylic acids, it is easy to obtain a polyester resin which has controlled crystallinity and the like within the predetermined ranges.

Furthermore, it is more preferable to use one or more kinds of polyalcohols selected from ethylene glycol, diethylene glycol, neopentyl glycol, and the like.

That is, it is because by using these specific polyalcohols, the melting point, thermal shrinkage ratio, thermal shrink stress, and the like of a polyester resin obtainable by reacting one of the polyalcohols with a polyvalent carboxylic acid can be adjusted more easily to be within predetermined ranges.

Therefore, when the total amount of the polyalcohol is taken as 100 mol %, it is preferable that the amount of one or more polyalcohols selected from ethylene glycol, diethylene glycol, neopentyl glycol, and the like is 90 mol % or greater, and it is more preferable that the amount is within 95 mol % to 100 mol %.

Then, in order to adjust the thermal characteristics and mechanical characteristics of the heat-shrinkable polyester film as necessary, other dicarboxylic acids and polyalcohols, or a hydroxycarboxylic acid may be used, and each of the compounds may be used solely, or a combination of the compounds as a mixture may also be used.

(2) Reaction Amount

The reaction amount of the polyalcohol is also not particularly limited; however, usually, it is preferable that 100 mol of polyvalent carboxylic acids including 80 mol % or greater of terephthalic acid and the like are reacted with polyalcohols at a proportion of 130 to 220 mol, it is more preferable that the polyvalent carboxylic acids are reacted with polyalcohols at a proportion of 150 to 210 mol, it is even more preferable that the polyvalent carboxylic acids are reacted with polyalcohols at a proportion of 180 to 200 mol, and a polyester resin obtained by crystallizing a reaction product of these is suitable.

In that case, regarding the reference of crystallinity in the polyester resin, it is preferable to adjust the degree of crystallization calculated based on a DSC curve measured according to JIS K 7122:2012 to be within 1% to 15%, it is more preferable to adjust the degree of crystallization to be within 2% to 10%, and it is even more preferable to adjust the degree of crystallization to be within 3% to 8%.

That is, the degree of crystallization of the polyester resin can be calculated based on the heat amount of melting (ΔHm) obtained from the melting peak area, the heat amount of crystallization (ΔHc) obtained from the crystallization peak area in the DSC curve, and the heat of perfect crystallization)(ΔHm⁰) of the crystallized polyethylene terephthalate by the following Formula (1).

$$\text{Degree of crystallization (\%)} = \frac{\Delta Hm - \Delta Hc}{\Delta Hm^0} \times 100 \quad (1)$$

ΔHm: heat amount of melting (J/g)
ΔHc: heat amount of crystallization (J/g)
ΔHm⁰: 140.2 J/g (heat amount of perfect crystallization of the crystallized polyethylene terephthalate)

3. Polyester Resin
(1) Melting Point

Regarding the characteristic (A), it is a feature that the melting point of the polyester resin is within 190° C. to 255° C.

The reason for this is that when such melting point has a value of below 190° C., the label produced with a heat-shrinkable polyester film is fused in a drying process at the time of recycling PET bottles, and the PET bottle recycled fragments may clump to one another.

On the other hand, it is because when such melting point has a value of above 255° C., the required heat amount for extrusion process and stretching processing of a sheet of the heat-shrinkable polyester film used for labels becomes too large, and processing may be difficult.

Therefore, it is more preferable that the melting point of the polyester resin is within 200° C. to 250° C., and it is even more preferable that the melting point is within 210° C. to 240° C.

The melting point of the polyester resin can be measured as, for example, the peak temperature of the heat of melting exhibited as an endothermic reaction in the profile obtainable using DSC, that is, the melting peak temperature (Tpm) (hereinafter, the same).

The crystallinity of the polyester resin can be estimated from the area (the peak area), the half-value width, and the like in such a peak of the heat of melting.

(2) Average Molecular Weight

It is also preferable that the inherent viscosity (IV value) of the polyester resin is within 0.65 to 0.85 dL/g.

The reason for this is that when such inherent viscosity has a value of below 0.65 dL/g, the melt viscosity becomes too low, and there may be a problem with extrusion moldability.

On the other hand, it is because when such inherent viscosity has a value of above 0.85 dL/g, the melt viscosity becomes too high, and there may also be a problem with extrusion moldability.

Therefore, it is more preferable that the inherent viscosity is within 0.68 to 0.83 dL/g, and it is even more preferable that the inherent viscosity is within 0.7 to 0.8 dL/g.

Incidentally, the inherent viscosity of the polyester resin can be measured according to JIS K 7390 (hereinafter, the same).

(3) Additives

Furthermore, it is preferable that additives such as antioxidant, weathering stabilizer, antistatic agent, antifogging agent, metal soap, wax, antifungal agent, antibacterial agent, nucleating agent, fire-retardant, and slipping agent are incorporated into the heat-shrinkable polyester film, as necessary.

Particularly, in order to enhance the slipperiness of the film surface, it is preferable that the polyester resin contains inorganic slipping agents such as calcium carbonate-based particles, silica-based particles, and glass-based particles.

The method of adding additives is not particularly limited, and any known method can be used. However, from the viewpoint of being convenient with excellent uniform mixing properties, a master batch method is suitable.

For example, specific examples (commercially available products) of a polyester resin-based master batch that may be used at the time of incorporating a Silica masterbatch as Anti-Blocking Agent (contains: 20% Silica, manufactured by Sukano AG, trade name: G dc S559-E).

In addition to that, it is also preferable to incorporate another resin to the extent that does not impair the physical properties, particularly the shrinkage ratio and the thermal shrink stress, of the heat-shrinkable film.

4. Thermal Characteristics (1) Thermal Shrinkage Ratio 1

The heat-shrinkable polyester film should have at least the following (B) and (C) as characteristics related to the thermal shrinkage ratio.

Figure 2:
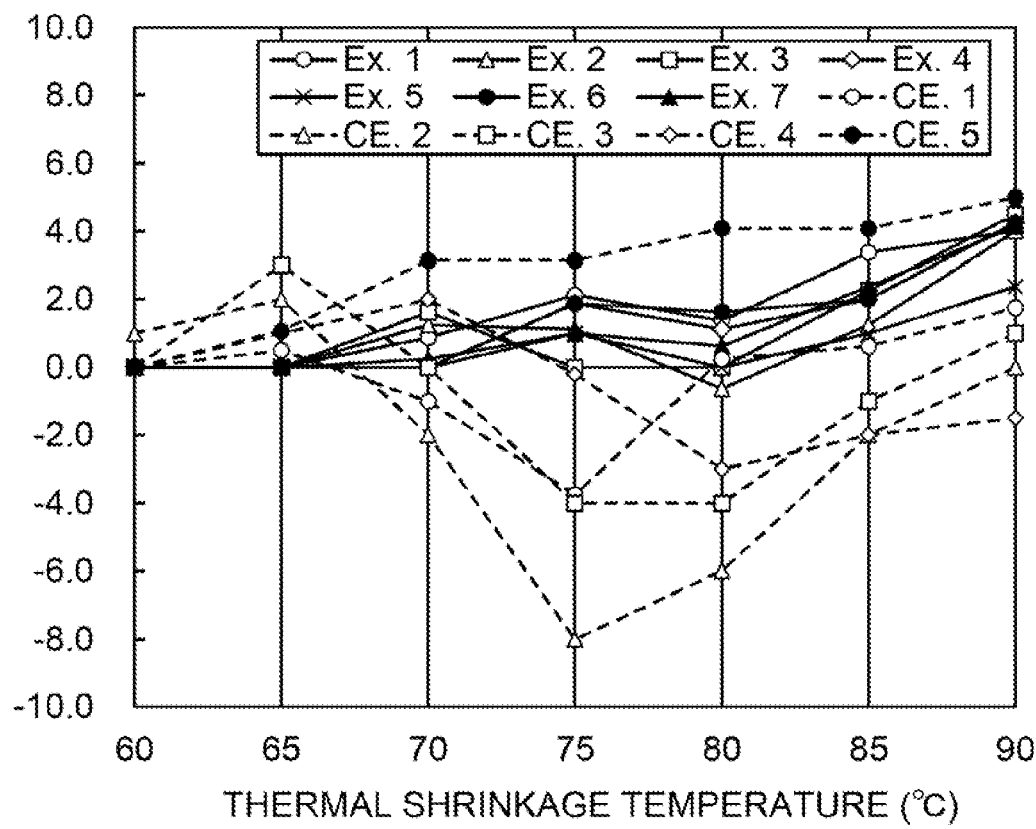

FIG. 2 shows the relationship between the thermal shrinkage temperature and the thermal shrinkage ratio in the MD direction of the heat-shrinkable polyester film in Example 1 and the like and Comparative Example 1 and the like that will be described below.

The thermal shrinkage is measured in accordance with ASTM D2732-08. When measuring the thermal shrinkage, the material is left in an atmosphere of 23° C. and 50% RH for at least 40 hours as a prescribed pretreatment (hereinafter, the same).

1) Characteristic (B)

As the characteristic (B), it is a feature that the thermal shrinkage ratio in the main shrinkage direction (TD direction) as measured under thermal shrinkage conditions of 85° C. for 10 seconds (for example, in hot water; hereinafter, the same) is within 45% to 70%.

The reason for this is that when the thermal shrinkage ratio in the TD direction in the case of subjecting the heat-shrinkable film to thermal shrinking at a predetermined temperature as such is controlled to be within a predetermined range, wrinkling is not likely to be generated, fewer collapses occur, and as a result, excellent external appearance is likely to be obtained.

Furthermore, it is because when the thermal shrinkage ratio in the TD direction at a relatively high temperature is limited, a balance in the overall thermal shrinkability of the heat-shrinkable polyester film is maintained, so that the thermal shrink stress thus generated can be reduced, and even if the heat-shrinkable film is recycled with PET bottles together, pellets can be obtained more stably.

Therefore, it is more preferable that such thermal shrinkage ratio in the TD direction is within 50% to 65%, and it is even more preferable that the thermal shrinkage ratio is within 55% to 63%.

2) Characteristic (C)

As the characteristic (C), it is a feature that the thermal shrinkage ratio in a direction (MD direction) orthogonally intersecting the main shrinkage direction as measured under thermal shrinkage conditions of 60° C. to 90° C. for 10 seconds is within −1% to 6%.

The reason for this is that when the heat-shrinkable film is subjected to thermal shrinking in a predetermined temperature range, by controlling the thermal shrinkage ratio in the MD direction to a predetermined range, wrinkling is not likely to be formed, fewer collapses occur, and as a result, excellent external appearance is likely to be obtained.

Furthermore, by limiting the thermal shrinkage ratio in the MD direction at a predetermined temperature, a balance in the overall thermal shrinkability of the heat-shrinkable polyester film is maintained, so that the thermal shrink stress thus generated can be reduced, and even if the heat-shrinkable film is recycled with PET bottles together, pellets can be obtained more stably.

Therefore, as the characteristic (C), it is more preferable that such thermal shrinkage ratio in the MD direction is within 0% to 5%, and it is even more preferable that the thermal shrinkage is within 0.5% to 3%.

(2) Thermal Shrinkage Ratio 2

1) Characteristic (C')

Furthermore, as the characteristic (C'), it is preferable that the thermal shrinkage ratio in a direction (MD direction) orthogonally intersecting the main shrinkage direction as measured under thermal shrinkage conditions at 70° C. for 10 seconds is within 0% to 3%.

The reason for this is that when the heat-shrinkable film is subjected to thermal shrinking in a predetermined temperature range, by controlling the thermal shrinkage ratio in the MD direction to a predetermined range, the occurrence of wrinkling and collapsing is further reduced, and excellent and smooth external appearance is likely to be obtained.

Furthermore, it is because by limiting the thermal shrinkage ratio in the MD direction at a relatively high temperature, a balance in the overall thermal shrinkability of the heat-shrinkable polyester film is maintained, so that the thermal shrink stress thus generated can be reduced, and even if the heat-shrinkable film is recycled with PET bottles together, pellets can be obtained more stably.

Therefore, as the characteristic (C'), it is more preferable that such thermal shrinkage ratio in the MD direction is within 0% to 2.5%, and it is even more preferable that the thermal shrinkage ratio is within 0% to 2%.

2) Characteristic (C")

As the characteristic (C"), it is preferable that the thermal shrinkage ratio in a direction (MD direction) orthogonally intersecting the main shrinkage direction as measured under thermal shrinkage conditions of 85° C. for 10 seconds is within 1% to 5%.

The reason for this is that when the heat-shrinkable film is subjected to thermal shrinking in a predetermined temperature range, by controlling the thermal shrinkage ratio in the MD direction to a predetermined range, the occurrence of wrinkling and collapsing is further reduced, and excellent and smooth external appearance is likely to be obtained.

Furthermore, by limiting the thermal shrinkage ratio in the MD direction at a relatively high temperature, a balance in the overall thermal shrinkability of the heat-shrinkable polyester film is maintained, so that the thermal shrink stress thus generated can be reduced, and even if the heat-shrinkable film is recycled with PET bottles together, pellets can be obtained more stably.

Therefore, as the characteristic (C"), it is more preferable that such thermal shrinkage ratio in the MD direction is within 1.5% to 4.5%, and it is even more preferable that the thermal shrinkage ratio is within 2% to 4%.

3) Characteristic (C''')

As the characteristic (C'''), it is preferable that the thermal shrinkage ratio in a direction (MD direction) orthogonally intersecting the main shrinkage direction as measured under thermal shrinkage conditions of 60° C. to 90° C. for 10 seconds has at least one minimal value, and this minimal value is −1% or greater.

The reason for this is that by limiting the thermal shrinkage ratio to have a minimal value of a predetermined magnitude, when the heat-shrinkable film is subjected to thermal shrinking, the occurrence of wrinkling and collapsing is further reduced, and it can be clearly determined that excellent external appearance is likely to be obtained, by actual measurement of thermal shrinkage, TMA, and the like.

Furthermore, it is because by limiting the thermal shrinkage ratio in the MD direction at a predetermined temperature with the profile shape (minimal value), a balance in the overall thermal shrinkability of the heat-shrinkable polyester film is maintained, so that the thermal shrink stress thus generated can be reliably reduced, and even if the heat-shrinkable film is recycled together with PET bottles together, pellets can be obtained more stably.

Therefore, as the characteristic (C'''), it is more preferable that the minimal value of such thermal shrinkage ratio in the MD direction is within 0% to 5%, and it is even more preferable that the minimal value is within 0.5% to 3%.

Figure 3:
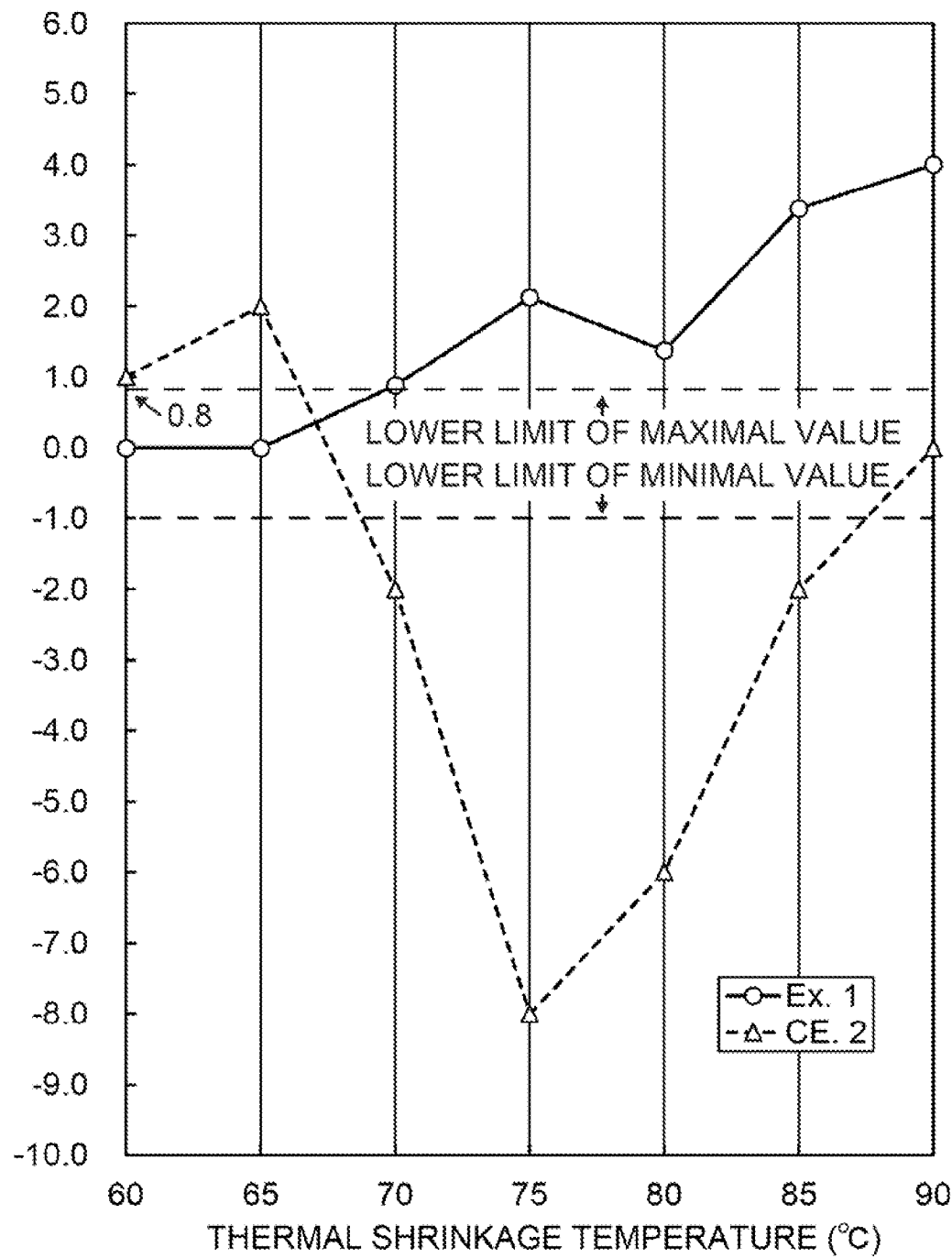
FIG. 3 is a diagram provided to explain the maximal value and the minimal value of the thermal shrinkage ratio in the MD direction with regard to the relationship between the thermal shrinkage temperature and the thermal shrinkage ratio in the MD direction of the heat-shrinkable polyester films in Example 1 and Comparative Example 2.

Here, in the characteristic curves in FIG. 2, FIG. 3, and the like, the minimal value of the thermal shrinkage ratio is the smallest thermal shrinkage ratio in the range of around the thermal shrinkage temperature corresponding to the minimal value and can be defined as a site where in the case of differentiating the value of the thermal shrinkage ratio, the gradient of the point of variation (extreme value) becomes zero.

More specifically, in the case of Example 1 in FIG. 3, the minimal value is the point of variation at a thermal shrinkage temperature of 80° C., and the value is 1.4%.

In contrast, in the case of Comparative Example 2 in FIG. 3, the minimal value is the point of variation at a thermal shrinkage temperature of 75° C., and the value is −8.0%.

Furthermore, at the time of subjecting the heat-shrinkable film to thermal shrinking, in order to reliably achieve that wrinklings are not likely to be formed and excellent external appearance is likely to be obtained, with regard to the characteristic (C'), it can be said that it is more preferable that the thermal shrinkage ratio in the MD direction does not have a negative value but has a positive value in a predetermined temperature range for 60° C. to 90° C.

4) Characteristic (C'''')

As the characteristic (C''), it is preferable that the thermal shrinkage ratio in a direction (MD direction) orthogonally intersecting the main shrinkage direction as measured under thermal shrinkage conditions for 60° C. to 90° C. for 10 seconds has at least one maximal value, and this maximal value corresponds to 0.8% or greater.

The reason for this is that by limiting the profile of the thermal shrinkage ratio in the MD direction under predetermined temperature conditions as such to have a maximal value of a predetermined magnitude, when the heat-shrinkable film is subjected to thermal shrinking, wrinklings are not likely to be formed, and it can be clearly determined that excellent external appearance is likely to be obtained, by actual measurement of thermal shrinkage, TMA, and the like.

Furthermore, by limiting the thermal shrinkage ratio in the MD direction at a predetermined temperature with the profile shape (maximal value), a balance in the overall thermal shrinkability of the heat-shrinkable polyester film is maintained, so that the thermal shrink stress thus generated can be reliably reduced, and even if the heat-shrinkable film is recycled with PET bottles together, pellets can be obtained more stably.

Therefore, as the characteristic (C''''), it is more preferable that the maximal value of such thermal shrinkage ratio in the MD direction is within 1% to 8%, and it is even more preferable that the maximal value is within 1.2% to 5%.

Here, in the characteristic curves in FIG. 2, FIG. 3, and the like, the maximal value of the thermal shrinkage ratio is the largest thermal shrinkage ratio in the range of around the thermal shrinkage temperature corresponding to the maximal value and can be defined as a site where in the case of differentiating the value of the thermal shrinkage ratio, the gradient of the point of variation becomes zero.

More specifically, in the case of Example 1 in FIG. 3, the maximal value is the point of variation at a thermal shrinkage temperature of 75° C., and the value is 2.1%.

In contrast, in the case of Comparative Example 2 in FIG. 3, the maximal value is the point of variation at a thermal shrinkage temperature of 65° C., and the value is 2.0%.

(3) Thermal Shrinkage Ratio 3

With regard to the heat-shrinkable polyester film, usually, it is preferable that the thermal shrinkage ratio in the main shrinkage direction (TD direction) as measured at 60° C. for 10 seconds as the thermal shrinkage conditions is within 0% to 1%; the thermal shrinkage ratio in the main direction as measured at 70° C. for 10 seconds is within 0.5% to 10%; the thermal shrinkage ratio in the main direction as measured at 80° C. for 10 seconds is within 40% to 65%; and the thermal shrinkage ratio in the main direction as measured at 90° C. for 10 seconds is within 50% to 75%.

The reason for this is that with regard to the heat-shrinkable polyester film, when the thermal shrinkage ratios in the main shrinkage direction as measured at 60° C., 70° C., 80° C., and 90° C., respectively, for 10 seconds deviates from the value within the aforementioned predetermined range, versatile usability that can cope with various PET bottles ranging from thin-walled bottles to thick-walled bottles and having complicated shapes, which is similar to that of a polyvinyl chloride-based heat-shrinkable film, may not be obtained.

Therefore, with regard to the heat-shrinkable polyester film, it is more preferable that the thermal shrinkage ratio in the main shrinkage direction (TD direction) as measured at 60° C. for 10 seconds is within 0% to 0.5%; the thermal shrinkage ratio in the main direction as measured at 70° C. for 10 seconds is within 1% to 9%; the thermal shrinkage ratio in the main direction as measured at 80° C. for 10 seconds is within 45% to 60%; and the thermal shrinkage ratio in the main direction as measured at 90° C. for 10 seconds is within 55% to 70%.

(4) Thermal Shrink Stress

Furthermore, as the characteristic (D), the thermal shrink stress in the main shrinkage direction as measured under thermal shrinkage conditions of 85° C. is 16 MPa or less.

The reason for this is that when the thermal shrink stress measured at 85° C. has a value of above 16 MPa, a thermal shrink stress is similar to that of a polyvinyl chloride-based heat-shrinkable film may not be obtained, and as a result, versatile usability that can cope with various PET bottles ranging from thin-walled bottles to thick-walled bottles may not be obtained.

Therefore, it is more preferable that such thermal shrink stress is within 3 to 15 MPa, and it is even more preferable that the thermal shrink stress is within 6 to 14 MPa.

Furthermore, the thermal shrink stress at 85° C. can be calculated by dividing the thermal shrink force (N/15 mm)

at 85° C. for a long-shaped specimen, which is measured using a film thermal shrinkage tester according to ISO 14616-1997, by the thickness of the specimen.

(5) Thickness

Furthermore, the thickness of the heat-shrinkable polyester film can be modified in accordance with the various forms of PET bottles; however, usually, it is preferable to adjust the thickness to be within 20 to 100 µm.

The reason for this is that when the thickness of such a heat-shrinkable polyester film has a value of below 20 µm, film handling may become difficult, and the tensile strength and the like may be notably deteriorated.

On the other hand, it is because when the thickness of such a heat-shrinkable polyester film is above 100 µm, in case of being heated to a predetermined temperature, the film may not show uniform thermal shrinking, or it may be difficult to produce the film to have a uniform thickness.

Therefore, it is more preferable that the thickness of the heat-shrinkable polyester film is within 25 to 70 µm, and it is even more preferable that the thickness is within 30 to 50 µm.

Incidentally, the thickness of the heat-shrinkable polyester film can be measured according to ISO 4593 using a micrometer (manufactured by Mitutoyo Corporation, product name "Thickness Gauge 547-401").

(6) Functional Layer

It is also preferable that the heat-shrinkable polyester film has functional layers for imparting various functions as necessary, to the extent that does not impair the purpose and the like of the invention.

Examples of such functional layers include coating layers for imparting surface slipperiness, anti-fouling properties, weatherability, and the like, a transfer layer, and a print layer for imparting design properties.

Among these, particularly a coating layer that uses a surfactant is a preferred embodiment as a functional layer since this coating layer significantly contributes to the enhancement of antistatic properties and surface activity.

Figure 1B:
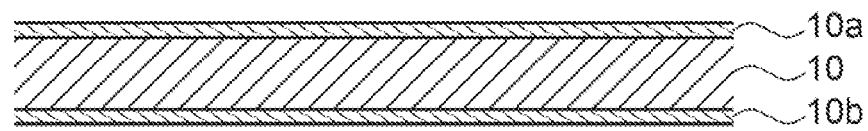

For example, as shown in FIG. 1B, it is also preferable to laminate other resin layers 10a and 10b each including at least one of these various additives, on one surface or both surfaces of the heat-shrinkable polyester film 10.

In that case, when the thickness of the heat-shrinkable polyester film is taken as 100%, it is preferable that the single layer thickness or total thickness of the other resin layers that are additionally laminated, is within 0.1% to 10% in general.

Then, the resin as a main component constituting the other resin layers may preferred to be a polyester resin which is similar to the heat-shrinkable polyester film, or it is acceptable that the resin is at least one of acrylic resin, olefin-based resin, urethane-based resin, rubber-based resin, and the like, all of which are different from a polyester resin.

Figure 1C:
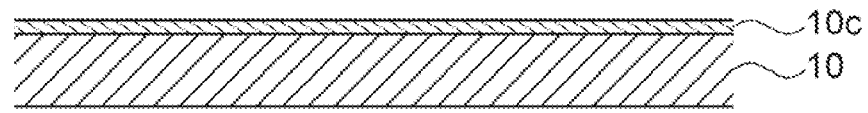

As shown in FIG. 1C, it is also preferable that the heat-shrinkable polyester film has multilayer structures, and a shrinkage ratio adjusting layer 10c is provided on the surface of the heat-shrinkable polyester film 10 in order to prevent from hydrolysis and improve scuffresistance.

Such a shrinkage ratio adjusting layer can be laminated as a predetermined layer formed from a polyester resin or the like, by adhesive, coating, heat, or the like according to the shrinkage characteristics of the heat-shrinkable polyester film.

(7) Calorific Value Corresponding to the Melting Peak Area

Furthermore, it is preferable that the calorific value corresponding to the melting peak area at the melting point of the polyester heat-shrinkable film is within 15 mJ/mg to 25 mJ/mg.

The reason for this is that in the polyester heat-shrinkable film, by controlling the calorific value corresponding to the melting peak area at the melting point of the polyester heat-shrinkable film to a predetermined range, the existing amount of the crystalline structure can be slightly limited and also adjusted to provide a broad melting region.

Therefore, in the polyester heat-shrinkable film, the shrink stress at a predetermined and the heat-shrinkage ratio at each predetermined temperature, respectively can be adjusted easily and stably, while maintaining the mechanical strength, transparency, and the like derived from the polyester resin as the main component, by a small amount of broad crystalline structure.

Conversely, if the calorific value corresponding to the melting peak area is outside the aforementioned range in the polyester heat-shrinkable film, excessive crystalline structure may be contained, making it difficult to further approximate the thermal and mechanical properties of polyvinyl chloride heat-shrinkable film.

Therefore, it is more preferable that the calorific value corresponding to the peak area measured by DSC of the polyester heat-shrinkable film is within 16 mJ/mg to 24 mJ/mg, and even more preferable that it is within 17 mJ/mg to 23 mJ/mg.

Herein, the DSC curve of a polyester-based heat-shrinkable film is described with reference to FIG. 10.

Figure 10:
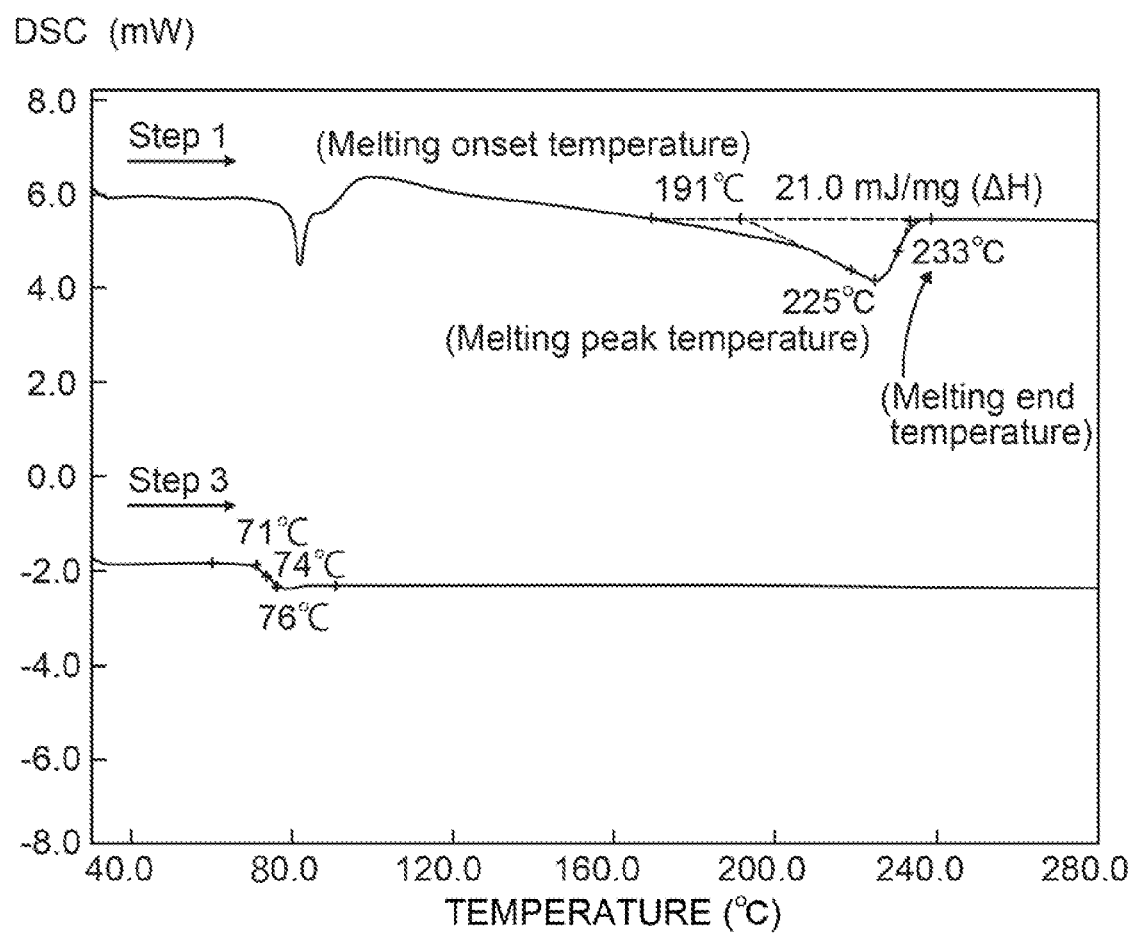
FIG. 10 shows a DSC chart for the polyester heat-shrinkable film of Example 1 of the invention.

Namely, FIG. 10 shows the DSC curve of the polyester heat-shrinkable film of Example 1 obtained by DSC measurement.

To obtain such a DSC curve, a sample of the polyester heat-shrinkable film is usually heated to a high temperature range in Step 1 (temperature increase from 25° C. to 280° C. at a rate of 10° C./min). Then, although not shown in the figure, the sample is lowered to a lower temperature range in Step 2 (temperature decrease from 280° C. to 25° C. at a rate of 30° C./min), and the sample is heated to a higher temperature range again in Step 3 (temperature increase from 25° C. to 280° C. at a rate of 10° C./min) to obtain the DSC curve as a thermal curve showing the glass transition temperature.

Then, based on the DSC curve in at least Step 1, the extrapolated melting onset temperature (hereinafter referred to simply as melting onset temperature), the melting point (melting peak temperature), and the extrapolated melting end temperature (hereinafter referred to simply as melting end temperature), and the calorific value corresponding to the peak area can be accurately measured.

Second Embodiment

A second embodiment is a method for producing the heat-shrinkable polyester film of the first embodiment.

The method will be specifically described below, separately for each of the steps.

1. Preparation and Mixing Step of Raw Materials

As raw materials, main ingredients and additives such as crystalline polyester resin pellets, rubber resins, antistatic agents, hydrolysis inhibitors, and inorganic slipping agents are prepared.

In this case, it is preferable to dry the crystalline polyester resin pellets, which are the main component, to an absolute dry state by heating at the predetermined temperature (usually, a temperature lower than the crystallization temperature by −10° C.) for a predetermined time (generally, 3-10 hours).

Next, it is preferable that the crystalline polyester resin pellets and the like are weighed and introduced into a mixer, and the raw materials are mixed and stirred until the mixture becomes uniform.

2. Sheet Production Step

Next, typically, it is preferable to produce a sheet having a predetermined thickness by extrusion molding (a T-die method), an inflation method, or a cast molding method.

More specifically, for example, extrusion molding is performed by an extruder under a condition of an extrusion temperature of 245° C., and thereby a sheet having a predetermined thickness (generally, 200 to 300 μm) can be obtained.

3. Production of Heat-Shrinkable Polyester Film

Next, the sheet thus obtained is heated and pressed by using a heat-shrinkable film production apparatus (tenter) while being moved on rolls or between rolls, and thereby a heat-shrinkable polyester film is produced.

However, as a stretching treatment method for exhibiting such shrinkable property, an inflation method, a roll stretching method, a tenter stretching method, and combinations thereof are known.

Further, from the viewpoint of obtaining more satisfactory productivity, sheet molding by a cast molding method and a combination of roll stretching and tenter stretching is further suitable.

That is, the polyester molecule constituting the heat-shrinkable polyester film is preferably crystallized into a predetermined shape by stretching in a predetermined direction while heating and pressing the film, while the film width is basically expanded at a predetermined stretching temperature and a predetermined stretching ratio.

Further, by solidification in this state, a heat-shrinkable polyester film having heat-shrinkable property that is used as decoration, a label, and the like can be produced.

Usually, it is preferable that, after the sheet is produced by a T-die method, an inflation method, or the like, the sheet is heated to a temperature equal to or higher than the glass transition temperature of the resin to be stretched at 3 to 8 times, preferably about 4 to 6 times, in the main stretching direction (the width direction of the sheet, that is, the TD direction).

4. Inspection Step for Heat-Shrinkable Polyester Film

It is preferable that for the produced heat-shrinkable polyester film, the following characteristics are measured continuously or intermittently, and a predetermined inspection step is provided.

That is, by measuring the following characteristics through a predetermined inspection step and checking that the characteristics have values within predetermined ranges, a heat-shrinkable polyester film having more uniform shrinkage characteristics and the like can be obtained.
  1) Visual inspection on external appearance of heat-shrinkable polyester film
  2) Thickness variation
  3) Tensile strength (ASTM D882)
  4) Tensile elongation (ASTM D882)
  5) Coefficient of friction (ASTM D1894)
  6) Specific gravity (ASTM D792)
  7) Ring crush test (TAPPI T882)
  8) Tear strength (ASTM D1922)
  9) DSC measurement for thermal characteristics (Melting point (Melting peak temperature) and the calorific value corresponding to the melting peak area)

EXAMPLES

Hereinafter, the invention will be described in detail based on Examples. However, the scope of rights of the invention is not intended to be narrowed by the description of the Examples without any particular reasons.

Furthermore, the crystalline polyester resin, the amorphous polyester resin, the polyvinyl chloride resin, and the additive used in the Examples are as follows.

Incidentally, the inherent viscosity (IV value) described in the column of the amorphous polyester resin was measured in a mixed solvent of phenol/1,1,2,2-tetrachloroethane (weight ratio=1/1) at a temperature of 30° C. using an Ubbelohde viscometer.

(PET1)

Polyester resin (manufactured by Eastman Chemical Company, trade name "Embrace Encore", glass transition temperature (Tg): 74° C., melting point: 217° C., density: 1.3 g/cm$^3$)

(PETG1)

Non-crystalline polyester resin formed from dicarboxylic acid:terephthalic acid 100 mol % and diol:ethylene glycol, 1,4-cyclohexanedimethanol, and diethylene glycol (manufactured by Eastman Chemical Company, trade name "Embrace LV", glass transition temperature (Tg): 68.2° C., no melting point, inherent viscosity (IV value): 0.7, density: 1.30 g/cm$^3$)

(PETG2)

Non-crystalline polyester resin formed from dicarboxylic acid: terephthalic acid 100 mol % and diol: ethylene glycol, 1,4-cyclohexanedimethanol, and diethylene glycol (manufactured by Eastman Chemical Company, trade name "Easter Copolyester GN001", glass transition temperature (Tg): 80° C., no melting point, density: 1.27 g/cm$^3$)

(PVC)

Polyvinyl chloride resin (manufactured by Shintech, Inc., trade name "SE800", K value; 60.6 to 62.0)

(Additive (Anti-Blocking Agent))

Silica masterbatch (manufactured by Sukano AG, trade name "G dc 5559-E", product containing 20% by weight of silica) obtained by blending 20 parts by mass of silica with respect to 80 parts by mass of polyethylene terephthalate Example 1

1. Production of Heat-Shrinkable Polyester Film

PET1 was prepared as a crystalline polyester resin.

Next, 1000 g of the prepared PET1 was introduced into a stirring vessel.

Furthermore, the aforementioned anti-blocking agent dried under a predetermined condition was blended as an anti-blocking agent of the heat-shrinkable film in a ratio of 1 part by weight when the amount of PET 1 was regarded as 100 parts by weight, thereby obtaining a raw material for the heat-shrinkable film.

Next, this raw material for the heat-shrinkable film was extruded under 245° C. with vent-type twin screw, and thereby created a sheet whose thickness is 250 μm.

Finally, a heat-shrinkable polyester film having a thickness of 40 μm and a variation in thickness of below 5% was produced by using a heat-shrinkable film production apparatus from the sheet at a preheating temperature of 120° C., a stretching temperature of 84° C., and an annealing temperature of 86.5° C. and at a stretching ratio (MD direction: 1.06 times, TD direction: 5 times).

2. Evaluation of Heat-Shrinkable Polyester Film (1) Thermal Shrinkage Ratio

The thermal shrinkage ratio of the heat-shrinkable polyester film thus obtained was measured according to ASTM D2732-08.

That is, the heat-shrinkable polyester film thus obtained was cut into a square shape having a length of 100 mm along the main shrinkage direction (TD direction) and a length of 100 mm along a non-main shrinkage direction (MD direction), and this was used as measurement samples.

Next, each sample was immersed in each thermostat bath inside which hot water temperature-controlled to 60° C. to 100° C. in increments of 5° C. is accommodated, for 10 seconds, and was thermally shrunk.

Next, the thermal shrinkage ratios (%) in the main shrinkage direction and the non-main shrinkage direction were respectively calculated according to the following Formula (2) from the dimensional changes before and after the heating treatment at each temperature.

$$\text{Thermal shrinkage ratio (\%)} = \frac{100 \text{ mm} - \text{Length of film after thermal shrinking}}{100 \text{ mm}} \times 100 \quad (2)$$

(2) Thermal Shrink Force and Thermal Shrink Stress

For the obtained heat-shrinkable polyester film, the thermal shrink force was measured according to ISO 14616-1997.

That is, the obtained heat-shrinkable polyester film was cut into a strip form in which the length along the main shrinkage direction was 90 mm and the length along the non-main shrinkage direction was 15 mm, and this was used as a specimen.

Next, the shrink force (N/15 mm) of the specimen at 85° C. was measured using a film thermal shrinkage tester (product name "FST-02" manufactured by Labthink Corporation).

Next, the obtained shrink force was divided by the thickness (40 μm) to obtain the thermal shrink stress (MPa) at 85° C.

(3) Haze

For the obtained heat-shrinkable polyester film, the haze value was measured according to ASTM D1003 using a haze meter (product name "Haze-gard Dual" manufactured by BYK-Gardner GmbH), and the haze value was evaluated according to the following criteria.

⊙ (Very good): The haze value is 7% or less.
○ (Good): The haze value is 10% or less.
Δ (Fair): The haze value is 13% or less.
x (Bad): The haze value is above 13%.

(4) DSC Measurement

For the obtained polyester heat-shrinkable film, melting onset temperature, melting point (melting peak temperature), melting end temperature, and the calorific value corresponding to the melting peak area were measured by a DSC (product name "DSC7000X" manufactured by Hitachi High-Tech Science Corporation) under predetermined conditions, respectively.

More specifically, a sample of the polyester heat-shrinkable film was dried in a dry oven at 60° C. for at least 6 hours.

Then, the sample was set in the DSC and the temperature was once raised to a high temperature range in Step 1 (temperature increase from 25° C. to 280° C. at a rate of 10° C./min).

Next, the temperature was lowered to a lower temperature range in Step 2 (temperature decrease from 280° C. to 25° C. at a rate of 30° C./min).

Finally, the temperature was raised to the high temperature range again in Step 3 (temperature increase from 25° C. to 280° C. at a rate of 10° C./min).

Then, from the DSC curve obtained in Step 1, melting onset temperature, melting point (melting peak temperature), melting end temperature, and the calorific value corresponding to the melting peak area were measured respectively.

Examples 2 to 7

With regard to Examples 2 to 7, heat-shrinkable polyester films were produced in the same manner as in Example 1, except that the thickness (μm) of the heat-shrinkable polyester film, the preliminary heating temperature (° C.), the stretching temperature (° C.), the annealing temperature (° C.), the stretching ratio (%), and the like were changed as shown in Table 1, and the heat-shrinkable films were evaluated. The respective obtained results are shown in Table 2.

Figure 4:
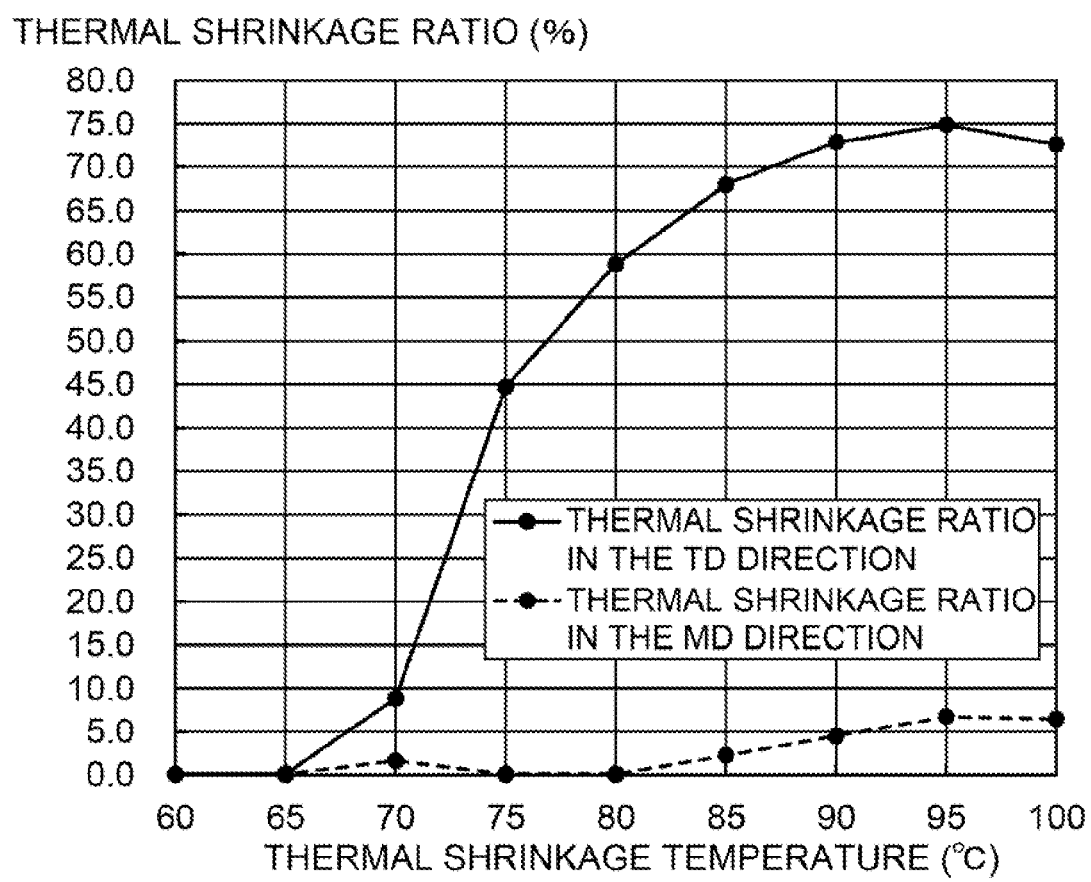
FIG. 4 is a diagram provided to explain the relationship between the thermal shrinkage temperature and the thermal shrinkage ratios in the TD direction and the MD direction of the heat-shrinkable polyester film in Example 3.
Figure 5:
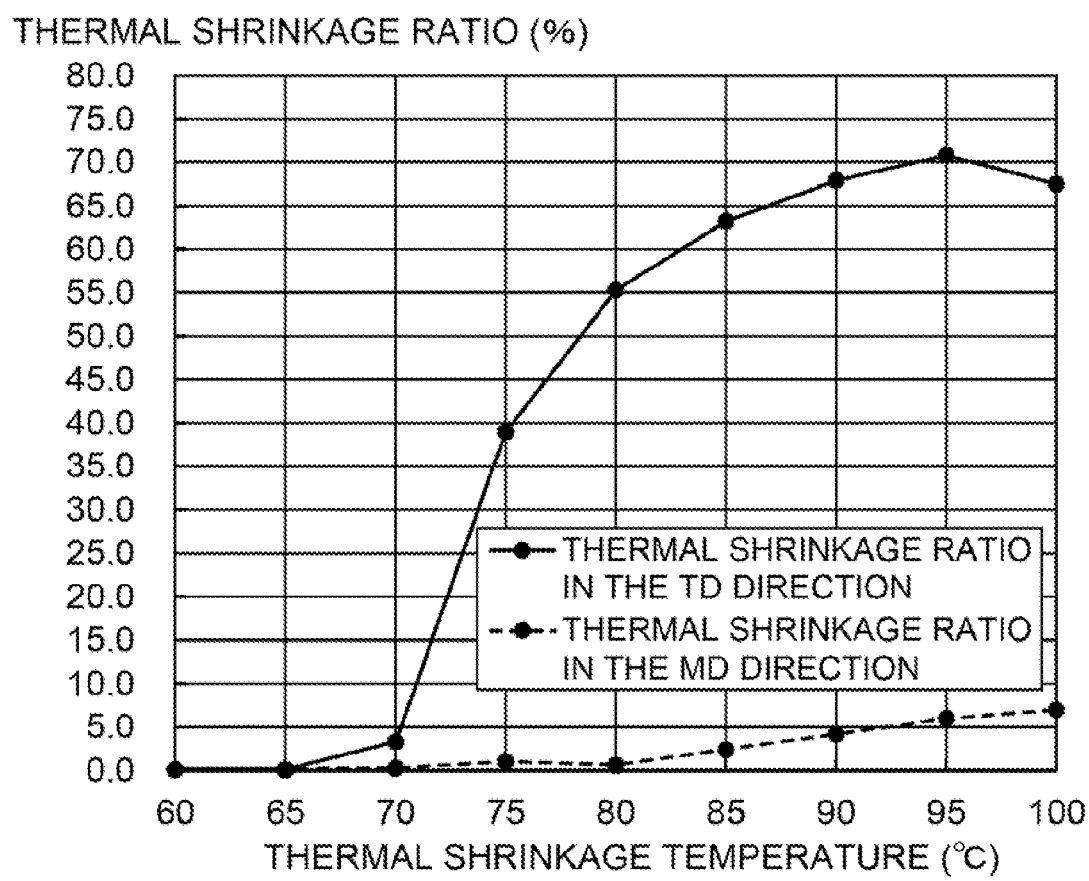
FIG. 5 is a diagram provided to explain the relationship between the thermal shrinkage temperature and the thermal shrinkage ratios in the TD direction and the MD direction of the heat-shrinkable polyester film in Example 7.

Furthermore, with regard to Examples 3 and 7, characteristic curves for explaining the relationship between the thermal shrinkage temperature and the thermal shrinkage ratios in the TD direction and the MD direction are shown in FIG. 4 and FIG. 5, respectively.

Comparative Example 1

With regard to Comparative Example 1, a heat-shrinkable polyester film was produced in the same manner as in Example 1, except that the thickness (μm) of the heat-shrinkable polyester film, the preliminary heating temperature (° C.), the stretching temperature (° C.), the annealing temperature (° C.), the stretching ratio (%), and the like were changed as shown in Table 1, and the heat-shrinkable film was evaluated. The obtained results are shown in Table 2.

Figure 6:
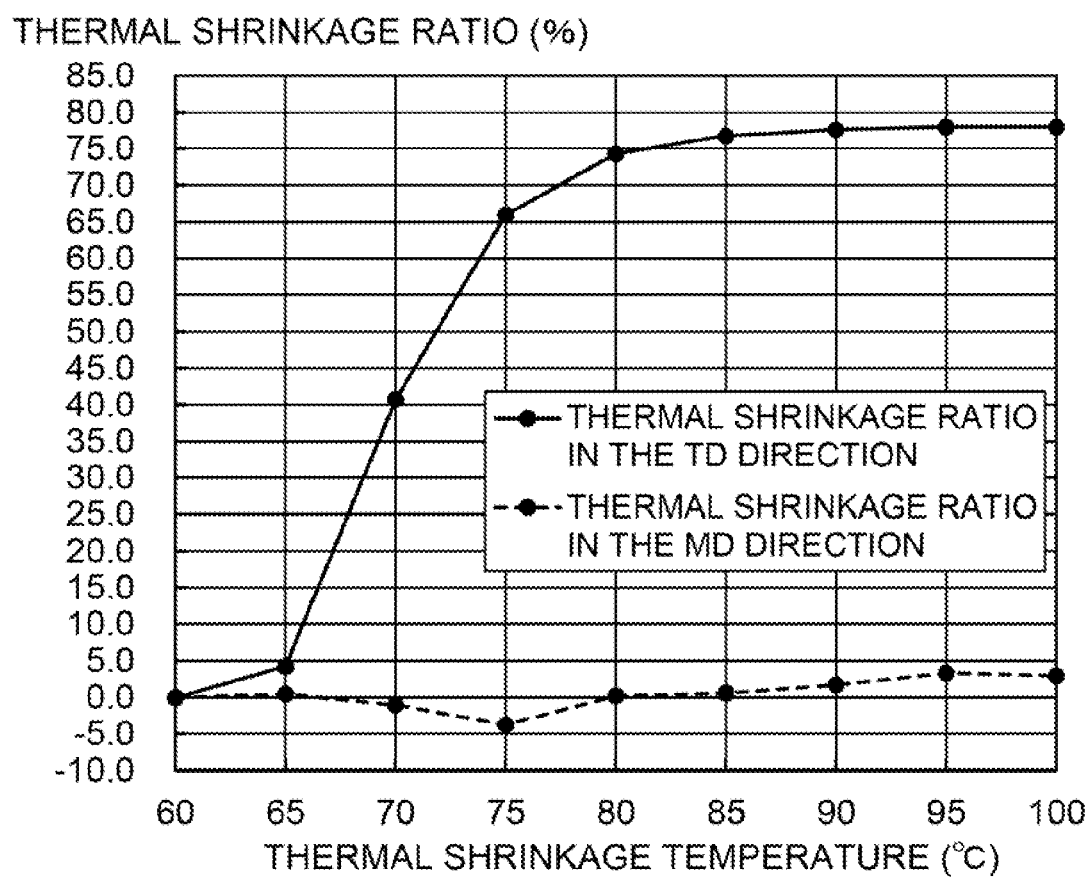
FIG. 6 is a diagram provided to explain the relationship between the thermal shrinkage temperature and the thermal shrinkage ratios in the TD direction and the MD direction of the heat-shrinkable polyester film in Comparative Example 1.

Furthermore, FIG. 6 shows a diagram provided to explain the relationship between the thermal shrinkage temperature of the heat-shrinkable polyester film and the thermal shrinkage ratios in the TD direction and the MD direction in Comparative Example 1.

Comparative Example 2

With regard to Comparative Example 2, a heat-shrinkable polyester film was produced in the same manner as in Example 1, except that the aforementioned PETG1 was used as the PET resin as shown in Table 1, and the heat-shrinkable film was evaluated. The obtained results are shown in Table 2.

Figure 7:
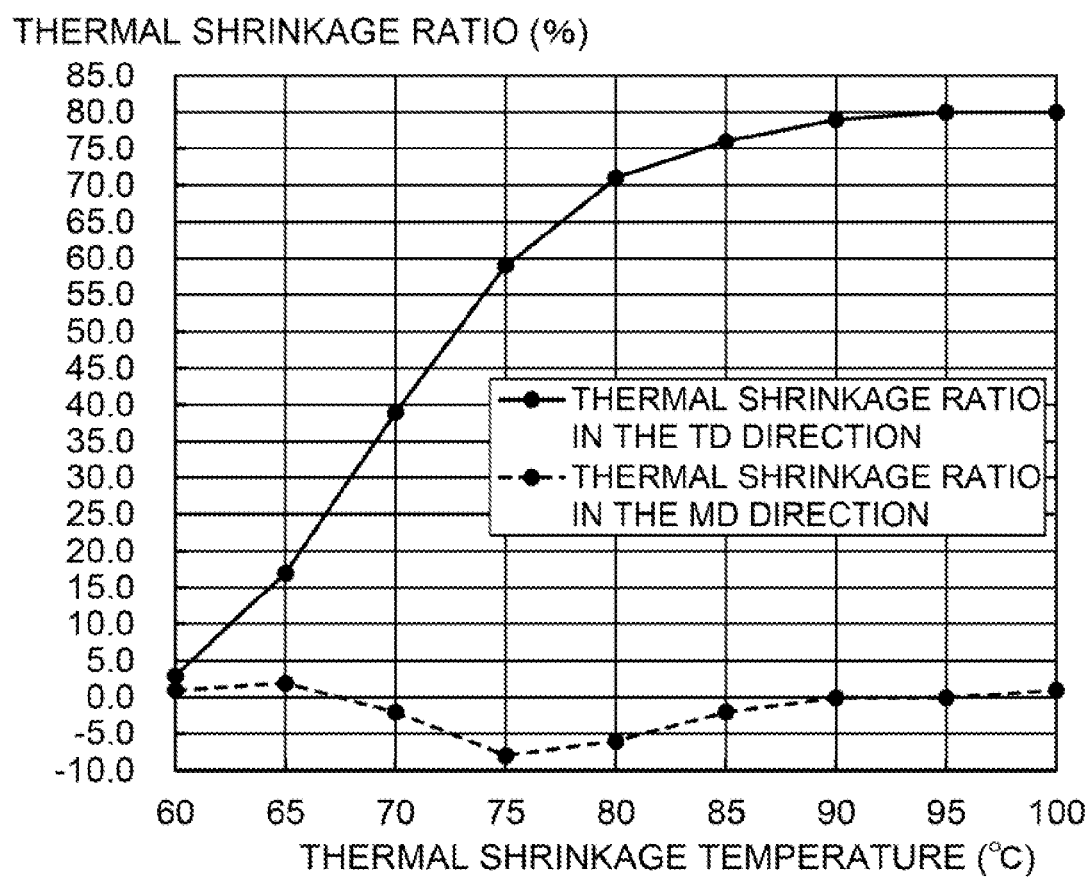
FIG. 7 is a diagram provided to explain the relationship between the thermal shrinkage temperature and the thermal shrinkage ratios in the TD direction and the MD direction of the heat-shrinkable polyester film in Comparative Example 2.

Furthermore, FIG. 7 shows a diagram provided to explain the relationship between the thermal shrinkage temperature of the heat-shrinkable polyester film and the thermal shrinkage ratios in the TD direction and the MD direction in Comparative Example 2.

Comparative Example 3

With regard to Comparative Example 3, a heat-shrinkable polyester film was produced in the same manner as in Example 1, except that the aforementioned PETG1 was used as the PET resin as shown in Table 1, and the heat-shrinkable film was evaluated. The obtained results are shown in Table 2.

Comparative Example 4

With regard to Comparative Example 4, a heat-shrinkable polyester film was produced in the same manner as in Example 1, except that the aforementioned PETG1 and PETG2 (mixing ratio=70/30) were used as the PET resin as shown in Table 1, and the heat-shrinkable film was evaluated. The obtained results are shown in Table 2.

Comparative Example 5

With regard to Comparative Example 5, a polyvinyl chloride-based heat-shrinkable film was produced in the same manner as in Example 1, except that the aforementioned polyvinyl chloride resin (PVC) was used as shown in Table 1, and the thermal shrinkage ratios at various temperatures, and the like were evaluated in the same manner as in Example 1. The obtained results are shown in Table 2.

Figure 8:
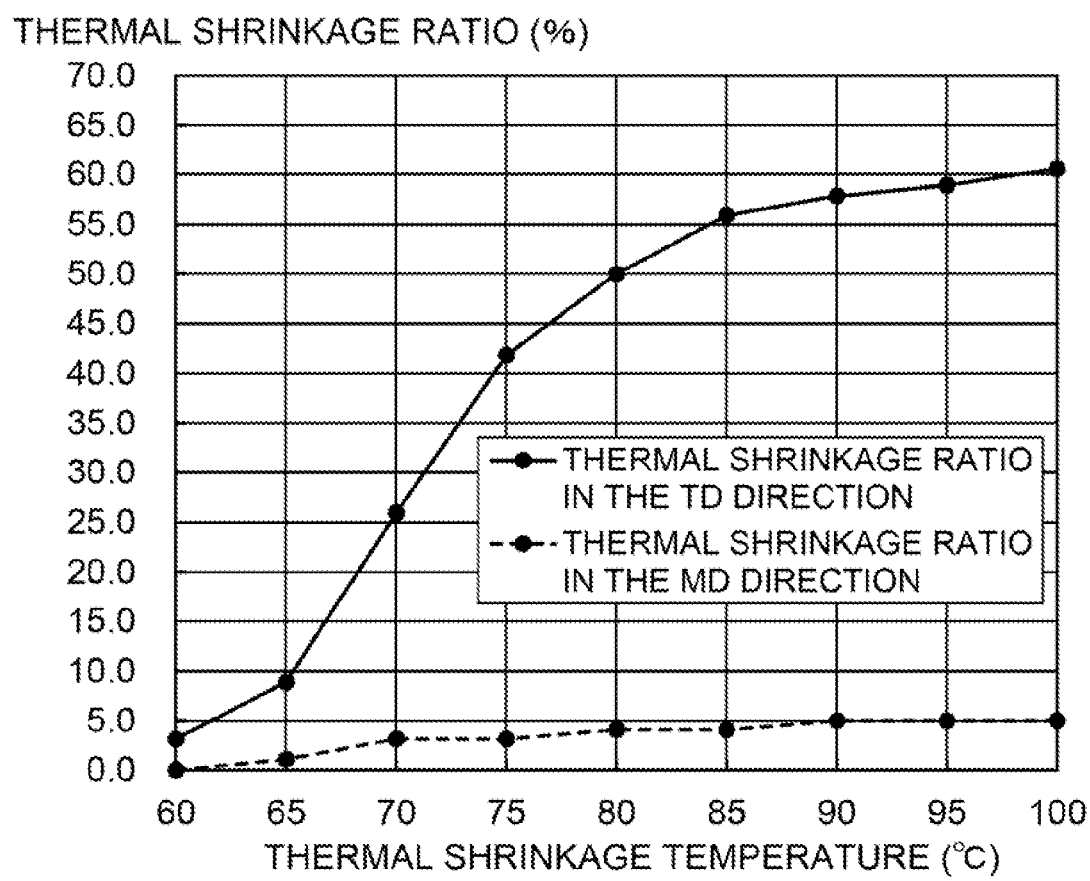
FIG. 8 is a diagram provided to explain the relationship between the thermal shrinkage temperature and the thermal shrinkage ratios in the TD direction and the MD direction of a polyvinyl chloride-based heat-shrinkable film in Comparative Example 5.
Figure 9A:
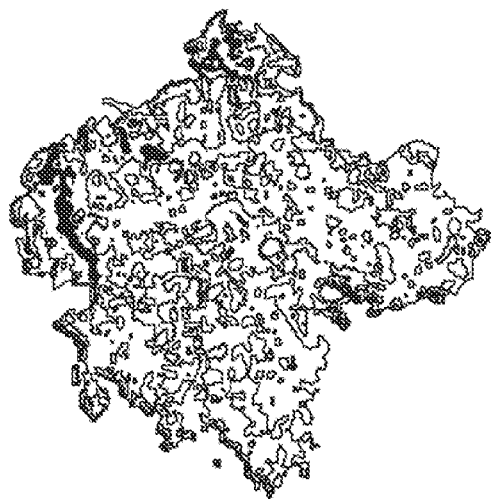
FIG. 9A is a diagram illustrating the state of PET bottles covered with a conventional heat-shrinkable polyester film after recycling process.
Figure 9B:
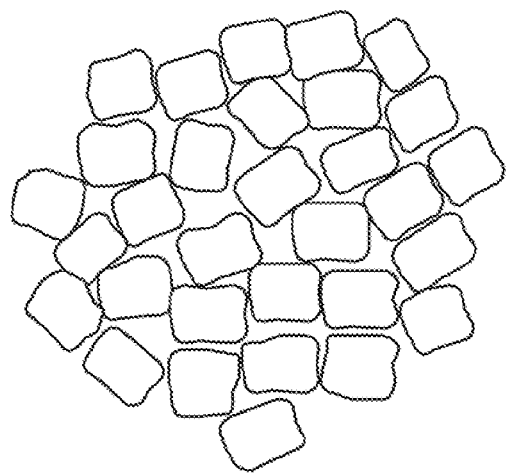
FIG. 9B is a diagram illustrating a recycled PET resin obtained after the recycling process for PET bottles covered with the heat-shrinkable polyester film of the invention.

Furthermore, FIG. 8 shows a diagram provided to explain the relationship between the thermal shrinkage temperature of the polyvinyl chloride-based heat-shrinkable film and the thermal shrinkage ratios in the TD direction and the MD direction in Comparative Example 5.

TABLE 1

| | Blending amount | | | | | Preliminary heating temperature (° C.) | Stretching temperature (° C.) | Annealing temperature (° C.) | MD stretching ratio | TD stretching ratio |
| | PET1 (pbw) | PETG1 (pbw) | PETG2 (pbw) | PVC (pbw) | Additive (pbw) | Thickness (μm) | | | | | |
|---|---|---|---|---|---|---|---|---|---|---|---|
| Example 1 | 100 | | | | 1 | 40 | 120 | 84 | 86.5 | 1.06 | 5 |
| Example 2 | 100 | | | | 1 | 45 | 120 | 80 | 85.5 | 1.06 | 5 |
| Example 3 | 100 | | | | 1 | 50 | 120 | 80 | 84.5 | 1.06 | 5 |
| Example 4 | 100 | | | | 1 | 40 | 115 | 90 | 89 | 1.06 | 5 |
| Example 5 | 100 | | | | 1 | 45 | 123 | 90 | 88.5 | 1.06 | 5 |
| Example 6 | 100 | | | | 1 | 50 | 125 | 87 | 86.5 | 1.06 | 5 |
| Example 7 | 100 | | | | 1 | 50 | 125 | 85 | 83.5 | 1.06 | 5 |
| Comparative Example 1 | 100 | | | | 1 | 45 | 125 | 77 | 72.5 | 1.06 | 5 |
| Comparative Example 2 | | 100 | | | 1 | 50 | 105 | 82 | 91 | 1 | 5 |
| Comparative Example 3 | | 100 | | | 1 | 50 | 110 | 77 | 83.5 | 1.08 | 5 |
| Comparative Example 4 | | 70 | 30 | | 1 | 50 | 118 | 97.6 | 88 | 1 | 5 |
| Comparative Example 5 | | | | 100 | | 50 | 100 | 78 | 78 | 1 | 3 |

TABLE 2

| | | Thermal shrinkage ratio at each temperature [%] (upper row: MD direction, lower row: TD direction) | | | | | | | | |
|---|---|---|---|---|---|---|---|---|---|---|
| | | 60° C. | 65° C. | 70° C. | 75° C. | 80° C. | 85° C. | 90° C. | 95° C. | 100° C. |
| Example 1 | | 0.0 | 0.0 | 0.9 | 2.1 | 1.4 | 3.4 | 4.0 | 6.8 | 7.8 |
| | | 0.0 | 0.0 | 3.6 | 34.3 | 51.5 | 60.0 | 63.9 | 67.3 | 64.6 |
| Example 2 | | 0.0 | 0.0 | 1.3 | 1.1 | −0.6 | 1.3 | 4.0 | 5.5 | 6.3 |
| | | 0.0 | 0.0 | 5.4 | 36.9 | 55.9 | 65.5 | 70.6 | 73.4 | 71.9 |
| Example 3 | | 0.0 | 0.0 | 1.6 | 0.0 | 0.0 | 2.3 | 4.5 | 6.8 | 6.5 |
| | | 0.0 | 0.0 | 8.9 | 44.8 | 58.9 | 68.0 | 72.9 | 74.9 | 72.6 |
| Example 4 | | 0.0 | 0.0 | 0.0 | 1.9 | 1.1 | 2.0 | 4.3 | 5.4 | 6.4 |
| | | 0.0 | 0.0 | 2.1 | 28.6 | 45.0 | 52.0 | 55.8 | 60.3 | 58.1 |
| Example 5 | | 0.0 | 0.0 | 0.0 | 1.0 | 0.0 | 1.0 | 2.4 | 4.0 | 4.0 |
| | | 0.0 | 0.0 | 0.6 | 29.5 | 44.0 | 50.4 | 55.1 | 60.8 | 57.8 |
| Example 6 | | 0.0 | 0.0 | 0.0 | 1.9 | 1.6 | 2.0 | 4.3 | 5.4 | 6.4 |
| | | 0.0 | 0.0 | 1.0 | 29.3 | 46.3 | 55.1 | 58.9 | 62.1 | 58.4 |
| Example 7 | | 0.0 | 0.0 | 0.3 | 1.0 | 0.6 | 2.4 | 4.1 | 6.0 | 7.0 |
| | | 0.0 | 0.0 | 3.3 | 39.0 | 55.3 | 63.3 | 67.9 | 70.8 | 67.5 |
| Comparative Example 1 | | 0.0 | 0.5 | −1.0 | −3.8 | 0.3 | 0.6 | 1.8 | 3.4 | 3.0 |
| | | 0.0 | 4.3 | 40.8 | 66.0 | 74.3 | 76.8 | 77.6 | 78.0 | 78.0 |
| Comparative Example 2 | | 1.0 | 2.0 | −2.0 | −8.0 | −6.0 | −2.0 | 0.0 | 0.0 | 1.0 |
| | | 3.0 | 17.0 | 39.0 | 59.0 | 71.0 | 76.0 | 79.0 | 80.0 | 80.0 |
| Comparative Example 3 | | 0.0 | 3.0 | 0.0 | −4.0 | −4.0 | −1.0 | 1.0 | 4.0 | 4.0 |
| | | 1.0 | 11.0 | 26.5 | 46.0 | 58.0 | 69.0 | 75.0 | 78.0 | 78.0 |
| Comparative Example 4 | | 0.0 | 1.0 | 2.0 | −0.2 | −3.0 | −2.0 | −1.5 | −2.5 | −3.0 |
| | | 0.0 | 1.6 | 5.0 | 24.0 | 41.0 | 53.0 | 63.0 | 71.5 | 74.5 |
| Comparative Example 5 | | 0.0 | 1.1 | 3.1 | 3.1 | 4.1 | 4.1 | 5.0 | 5.0 | 5.0 |
| | | 3.1 | 8.9 | 25.9 | 41.9 | 50.0 | 55.9 | 57.9 | 58.9 | 60.6 |

TABLE 2-continued

|  | Shrink stress [MPa] | Shrink force [N/15 mm] | Haze value [%] | Melting onset temperature [° C.] | Melting peak temperature [° C.] | Melting end temperature [° C.] | ΔH [mJ/mg] |
| --- | --- | --- | --- | --- | --- | --- | --- |
| Example 1 | 11.6 | 7.1 | 4.2 | 191 | 225 | 233 | 21.0 |
| Example 2 | 13.9 | 9.3 | 6.8 | 187 | 219 | 229 | 20.0 |
| Example 3 | 13.7 | 10.5 | 8.4 | 183 | 217 | 228 | 20.9 |
| Example 4 | 9.4 | 5.6 | 3.3 | 183 | 218 | 229 | 21.3 |
| Example 5 | 7.7 | 5.1 | 3.3 | 184 | 218 | 229 | 20.9 |
| Example 6 | 9.8 | 7.5 | 4.2 | 191 | 222 | 233 | 19.1 |
| Example 7 | 11.9 | 9.1 | 5.7 | 183 | 218 | 228 | 20.5 |
| Comparative Example 1 | 16.6 | 11.2 | 10.0 | 187 | 220 | 230 | 19.9 |
| Comparative Example 2 | 7.5 | 5.6 | 3.4 | — | — | — | — |
| Comparative Example 3 | 6.9 | 5.2 | 3.5 | — | — | — | — |
| Comparative Example 4 | 7.9 | 5.9 | 4.3 | — | — | — | — |
| Comparative Example 5 | 5.7 | 4.3 | 3.2 | — | — | — | — |

INDUSTRIAL APPLICABILITY

According to the invention, there can be provided a heat-shrinkable polyester film having low thermal shrink stress and the like occurring at the time of thermal shrinkage by having at least characteristics (A) to (D), even in a case where PET bottles in a state of being covered with the heat-shrinkable polyester film are recycled together, pellets having a predetermined shape can be produced effectively and stably, and wall thickness reduction of the PET bottles and the like can be managed.

Therefore, according to the heat-shrinkable polyester film of the invention, even if PET bottles are thin-walled or thick-walled or have a complicated shape, the heat-shrinkable polyester film not only can cover various PET bottles and the like but also can be recycled together with various PET bottles and the like, and as a result, the versatile usability can be significantly enhanced, and it can be said that the industrial applicability thereof is very high.

EXPLANATIONS OF LETTERS OR NUMERAL

10 HEAT-SHRINKABLE POLYESTER FILM
10a OTHER RESIN LAYER 1
10b OTHER RESIN LAYER 2
10c SHRINKAGE RATIO ADJUSTMENT LAYER

What is claimed is:

1. A heat-shrinkable polyester film derived from a polyester resin as a reaction product between a polyvalent carboxylic acid and a polyalcohol,
wherein the calorific value corresponding to the melting peak area at the melting point measured by DSC of the polyester heat-shrinkable film is within 15 mJ/mg to 25 mJ/mg, and
the heat-shrinkable polyester film has the following characteristics (A) to (D) and (C2):
(A) the melting point measured by DSC of the polyester resin is within 190° C. to 255° C.;
(B) the thermal shrinkage ratio in a main shrinkage direction as measured under thermal shrinkage conditions of 85° C. for 10 seconds is within 45% to 70%;
(C) the thermal shrinkage ratio in a direction orthogonally intersecting the main shrinkage direction as measured under thermal shrinkage conditions of 60° C. to 90° C. for 10 seconds is within −1% to 6%; and
(D) the thermal shrink stress in the main shrinkage direction as measured under thermal shrinkage conditions of 85° C. is 16 MPa or less; and
(C2) the thermal shrinkage ratio in the main shrinkage direction as measured at 70° C. for 10 seconds is within 1% to 9%.

2. The heat-shrinkable polyester film according to claim 1, wherein (C') the thermal shrinkage ratio in a direction orthogonally intersecting the main shrinkage direction as measured under thermal shrinkage conditions of 70° C. for 10 seconds is within 0% to 3%.

3. The heat-shrinkable polyester film according to claim 1, wherein (C'') the thermal shrinkage ratio in a direction orthogonally intersecting the main shrinkage direction as measured under thermal shrinkage conditions of 85° C. for 10 seconds is within 1% to 5%.

4. The heat-shrinkable polyester film according to claim 1, wherein (C''') the thermal shrinkage ratio in a direction orthogonally intersecting the main shrinkage direction as measured under thermal shrinkage conditions of 60° C. to 90° C. for 10 seconds has at least one minimal value, and this minimal value is −1% or greater.

5. The heat-shrinkable polyester film according to claim 1, wherein (C'''') the thermal shrinkage ratio in a direction orthogonally intersecting the main shrinkage direction as measured under thermal shrinkage conditions of 60° C. to 90° C. for 10 seconds has at least one maximal value, and this maximal value is 0.8% or greater.

6. The heat-shrinkable polyester film according to claim 1, wherein the film thickness is within 10 to 100 μm.

7. The heat-shrinkable polyester film according to claim 1, wherein the polyvalent carboxylic acid includes terephthalic acid as a main component, and the polyalcohol is at least one of ethylene glycol, neopentyl glycol, 1,4-cyclohexanedimethanol, and diethylene glycol.

8. The heat-shrinkable polyester film according to claim 1, wherein the haze value of the film before shrinking in accordance with ASTM D1003 is 7% or less.

* * * * *